United States Patent
Chae

(10) Patent No.: US 10,878,229 B2
(45) Date of Patent: Dec. 29, 2020

(54) SHAPE DISCRIMINATION DEVICE, SHAPE DISCRIMINATION METHOD AND SHAPE DISCRIMINATION PROGRAM

(71) Applicant: Rakuten, Inc., Tokyo (JP)

(72) Inventor: Yeongnam Chae, Setagaya-ku (JP)

(73) Assignee: Rakuten, Inc., Tokyo (JP)

( * ) Notice: Subject to any disclaimer, the term of this patent is extended or adjusted under 35 U.S.C. 154(b) by 231 days.

(21) Appl. No.: 16/303,901

(22) PCT Filed: May 26, 2016

(86) PCT No.: PCT/JP2016/065618
§ 371 (c)(1),
(2) Date: Nov. 21, 2018

(87) PCT Pub. No.: WO2017/203663
PCT Pub. Date: Nov. 30, 2017

(65) Prior Publication Data
US 2020/0320285 A1    Oct. 8, 2020

(51) Int. Cl.
*G06K 9/00* (2006.01)
*G06K 9/52* (2006.01)
(Continued)

(52) U.S. Cl.
CPC ....... *G06K 9/00362* (2013.01); *G06K 9/2054* (2013.01); *G06K 9/4604* (2013.01); *G06K 9/52* (2013.01)

(58) Field of Classification Search
CPC .... G06K 9/00362; G06K 9/2054; G06K 9/52; G06K 9/4604
See application file for complete search history.

(56) References Cited

U.S. PATENT DOCUMENTS 5,315,666 A * 5/1994 Norton-Wayne .... G01B 11/024
                                               382/111
9,349,076 B1 * 5/2016 Liu .................... G06K 9/00369
(Continued)

FOREIGN PATENT DOCUMENTS

JP        2012-194782 A    10/2012

OTHER PUBLICATIONS

Kalantidis et al., Getting the Look: Clothing Recognition and Segmentation for Automatic Product Suggestions in Everyday Photos (Year: 2013).*
(Continued)

*Primary Examiner* — John B Strege
(74) *Attorney, Agent, or Firm* — Sughrue Mion, PLLC

(57) ABSTRACT

A shape discriminating device includes an image acquisition means configured to acquire a target image being an image where pants are shown, a diverging position acquisition means configured to acquire, as a diverging position, a position where the pants diverge into two leg parts or a position which can be regarded as a position where the pants diverge into two leg parts, a leg region extraction means configured to extract a leg region from a region showing the pants in the target image, a leg shape acquisition means configured to acquire leg shape information concerning variation in lateral width of a leg part of the pants based on the diverging position and the leg region, a specifying means configured to specify a shape of the pants based on the leg shape information, and an output means configured to output information concerning the specified shape of the pants.

15 Claims, 17 Drawing Sheets

(51) Int. Cl.
*G06K 9/46* (2006.01)
*G06K 9/20* (2006.01)

(56) References Cited

U.S. PATENT DOCUMENTS

| | | | |
|---|---|---|---|
| 9,513,788 B2* | 12/2016 | Suzuki | G06Q 30/0643 |
| 10,176,636 B1* | 1/2019 | Neustein | G06T 7/246 |
| 2006/0251338 A1* | 11/2006 | Gokturk | G06F 16/583 |
| | | | 382/305 |
| 2012/0051651 A1* | 3/2012 | Yamaoka | G06K 9/468 |
| | | | 382/195 |
| 2017/0124420 A1* | 5/2017 | Zhao | G06K 9/48 |

OTHER PUBLICATIONS

Meunier et al., Measurement accuracy and precision assessment of an image-based clothing and equipment sizing system (Year: 1999).*
Coffey et al., Photo Based Clothing Measurements. (Year: 2016).*
International Preliminary Report on Patentability with English Translation of Written Opinion for PCT/JP2016/065618 dated Dec. 6, 2018.

* cited by examiner

SHAPE DISCRIMINATION DEVICE, SHAPE DISCRIMINATION METHOD AND SHAPE DISCRIMINATION PROGRAM

CROSS REFERENCE TO RELATED APPLICATIONS

This application is a National Stage of International Application No. PCT/JP2016/065618 filed May 26, 2016.

TECHNICAL FIELD

The present invention relates to a shape discriminating device, a shape discriminating method, and a shape discriminating program.

BACKGROUND ART

Techniques to recognize the shape of an object included in an image have been known. For example, the system disclosed in Patent Literature 1 recognizes the shape of clothing by association with template data.

CITATION LIST

Patent Literature

PTL1: Japanese Unexamined Patent Application Publication No. 2012-194782

SUMMARY OF INVENTION

Technical Problem

However, there are cases where it is not possible to specify and discriminate the shape of clothing by association with template data, such as when clothing is deformed according to the pose of a model wearing the clothing in the image, for example, In view of the foregoing, an object of the present invention is to discriminate the shape of pants shown in an image without association with template data.

Solution to Problem

To solve the above problem, a shape discriminating device according to one embodiment of the present invention includes an image acquisition means configured to acquire a target image being an image where pants are shown, a diverging position acquisition means configured to acquire, as a diverging position, a position where the pants diverge into two leg parts or a position which can be regarded as a position where the pants diverge into two leg parts, a leg region extraction means configured to extract a leg region from a region showing the pants in the target image, a leg shape acquisition means configured to acquire leg shape information concerning variation in lateral width of a leg part of the pants based on the diverging position and the leg region, a specifying means configured to specify a shape of the pants based on the leg shape information, and an output means configured to output information concerning the shape of the pants specified by the specifying means.

A shape discriminating method according to one embodiment of the present invention is a shape discriminating method in a shape discriminating device, the method including an image acquisition step of acquiring a target image being an image where pants are shown, a diverging position acquisition step of acquiring, as a diverging position, a position where the pants diverge into two leg parts or a position which can be regarded as a position where the pants diverge into two leg parts, a leg region extraction step of extracting a leg region from a region showing the pants in the target image, a leg shape acquisition step of acquiring leg shape information concerning variation in lateral width of a leg part of the pants based on the diverging position and the leg region, a specifying step of specifying a shape of the pants based on the leg shape information, and an output step of outputting information concerning the shape of the pants specified in the specifying step.

A shape discriminating program according to one embodiment of the present invention causes a computer to function as an image acquisition means configured to acquire a target image being an image where pants are shown, a diverging position acquisition means configured to acquire, as a diverging position, a position where the pants diverge into two leg parts or a position which can be regarded as a position where the pants diverge into two leg parts, a leg region extraction means configured to extract a leg region from a region showing the pants in the target image, a leg shape acquisition means configured to acquire leg shape information concerning variation in lateral width of a leg part of the pants based on the diverging position and the leg region, a specifying means configured to specify a shape of the pants based on the leg shape information, and an output means configured to output information concerning the shape of the pants specified by the specifying means.

According to the embodiment described above, the leg shape information concerning variation in lateral width of a leg part of pants is acquired based on a diverging position and a leg region extracted from a target image in which the pants are shown. Because the shape of the pants is specified based on the leg shape information in consideration that the characteristics of the shape of the pants appear in the leg shape information, it is possible to appropriately specify and discriminate the shape of the pants without comparison with a template.

In the shape discriminating device according to another embodiment, the leg shape acquisition means may include a leg line generation means configured to generate a first leg line and a second leg line, the first leg line connecting from a center of a hip line to an inner portion at a lower end of the leg region, the hip line being drawn through the diverging position to both lateral ends of the region showing the pants, and the second leg line connecting from an outer portion at the lower end of the leg region to one end of the hip line corresponding to the outer portion, and a leg line angle acquisition means configured to acquire a leg line angle being an angle between the first leg line and the second leg line, and the specifying means may acquire the leg line angle as the leg shape information.

According to the embodiment described above, the first and second leg lines are generated based on the hip line and the leg region extracted from the target image in which the pants are shown. Because the shape of the pants is specified based on the leg line angle in consideration that the characteristics of the shape of the pants appear in the leg line angle, which is the angle between the first and second leg lines, it is possible to appropriately specify and discriminate the shape of the pants without comparison with a template.

In the shape discriminating device according to another embodiment, when the leg line angle is a specified value or more and a distance between upper ends of the first leg line and the second leg line is larger than a distance between lower ends of the first leg line and the second leg line, the specifying unit may determine that the shape of the pants is a skinny type, and when the leg line angle is a specified value or more and a distance between upper ends of the first leg line and the second leg line is smaller than a distance between lower ends of the first leg line and the second leg line, the specifying unit may determine that the shape of the pants is a wide type.

According to the embodiment described above, it is possible to appropriately discriminate whether the shape of the pants is a skinny type or a wide type.

In the shape discriminating device according to another embodiment, the leg shape acquisition means may acquire a thigh width and a hem width, the thigh width being a length from a center to one end of a hip line drawn through the diverging position to both lateral ends of the region showing the pants, and the hem width being a width at a lower end of a region corresponding to one of two legs in the leg region, and the specifying means may acquire the thigh width and the hem width as the leg shape information.

According to the embodiment described above, because the shape of the pants is specified based on the thigh width and the hem width where the characteristics of the shape of the pants appear, it is possible to appropriately specify and discriminate the shape of the pants.

In the shape discriminating device according to another embodiment, the diverging position acquisition means may acquire, as the diverging position, a position where a lateral width is largest in a vertical direction of a contour of the pants when a waist and a hem of the pants are located at top and bottom, respectively.

The position at which the lateral width is largest in the vertical direction of the pants is likely to be the position where the pants diverge into two leg parts. According to the above embodiment, because such a position is acquired as the diverging position, it is possible to use the diverging position for discrimination of the shape of the pants.

In the shape discriminating device according to another embodiment, the diverging position acquisition means may approximate each of contours on both lateral sides of the pants by a quadratic curve, and acquire, as the diverging position, a position where a distance between the both curves is largest in a vertical direction.

According to the embodiment described above, the diverging position at which the pants diverge into two leg parts and which indicates the vertical height of the hip line is acquired with high accuracy.

In the shape discriminating device according to another embodiment, the diverging position acquisition means may calculate a plurality of quadratic curves based on arbitrary three points on a contour line representing a contour on both lateral sides of the pants, and use a quadratic curve with a highest degree of consistency with the contour line, among the calculated plurality of quadratic curves, for acquiring the diverging position.

According to the embodiment described above, among a plurality of quadratic curves calculated based on three points on a contour line representing a contour on both lateral sides, the quadratic curve with the highest degree of consistency with the contour line is used for acquisition of the diverging position. Thus, even when noise is contained in a contour line extracted from the image, a calculated quadratic curve containing noise is not used for acquisition of the diverging position, and it is thereby possible to accurately acquire the diverging position.

In the shape discriminating device according to another embodiment, the leg region extraction means may extract, as the leg region, at least one region in a region showing the pants and separable into a left leg region and a right leg region respectively corresponding to a left leg and a right leg.

According to the embodiment described above, because a region that can be separated into the left leg region and the right leg region respectively corresponding to the left and right legs in the region showing the pants in the target image is a candidate for the leg region, a region that is likely to show the leg part in the pants can be extracted as the leg region.

In the shape discriminating device according to another embodiment, the leg region extraction means may extract, as the leg region, a region with a longest vertical length in the region showing the pants and separable into the left leg region and the right leg region.

According to the embodiment described above, because a region with the longest vertical length in the region separable into the left leg region and the right leg region is extracted as the leg region, it is possible to extract, as the leg region, a region that is likely to more appropriately reflect the characteristics of the shape of the leg part of the pants shown in the target image.

In the shape discriminating device according to another embodiment, the leg region extraction means may extract, as the leg region, a region where a difference in width between the left leg region and the right leg region corresponding to each other at the same vertical height is a specified value or less in the region showing the pants and separable into the left leg region and the right leg region.

If a difference in width between the left leg region and the right leg region extracted and separated from the target image is large, those regions are not likely to correctly reflect the shape of the leg part of the pants. Because a region where a difference in width between the left leg region and the right leg region is a specified value or less is extracted as the leg region in the above embodiment, it is possible to extract, as the leg region, a region that is likely to more correctly reflect the shape of the leg part of the pants.

In the shape discriminating device according to another embodiment, the leg region extraction means may extract, as the leg region, a region with a larger width between the left leg region and the right leg region corresponding to each other at the same vertical height.

In the region of the leg part of the pants shown in the target image, an image of the wider region is likely to be taken from the position closer to the front. According to the above embodiment, because a region with a larger width between the left leg region and the right leg region corresponding to each other at the same vertical height is extracted as the leg region, it is possible to extract, as the leg region, a region that is likely to more accurately reflect the shape of the leg part of the pants, and it is thereby possible to accurately discriminate the shape of the pants.

The shape discriminating device according to another embodiment may further include a hip line angle acquisition means configured to specify a waist position of the pants based on the diverging position, and acquire a hip line angle being an angle between a left hip line and a right hip line obtained by connecting left and right ends of a waist line and left and right ends of the hip line, respectively, the waist line being drawn through the waist position to both lateral ends of the region showing the pants, wherein the specifying means may specify the shape of the pants based on the hip line angle and the leg shape information.

According to the embodiment described above, the hip line angle is acquired based on the hip line and the waist line extracted from the target image. Because the characteristics of the shape of the pants appear in the contour from the waist line part to the hip line part of the pants, the shape of the pants is reflected on the hip line angle. Because the shape of the pants is specified based on the hip line angle and the leg shape information, it is possible to specify and discriminate the shape of the pants in detail without comparison with a template.

In the shape discriminating device according to another embodiment, when the leg line angle is less than a specified value and the hip line angle is a specified value or more, the specifying unit may specify that the shape of the pants is a wide type, and when the leg line angle is less than a specified value and the hip line angle is less than a specified value, the specifying unit may specify that the shape of the pants is a straight type.

According to the embodiment described above, it is possible to appropriately discriminate that the shape of pants between wide and straight types.

Advantageous Effects of Invention

According to one aspect of the present invention, it is possible to discriminate the shape of pants in an image without association with template data.

DESCRIPTION OF EMBODIMENTS

An embodiment of the present invention is described hereinafter in detail with reference to the appended drawings. Note that, in the description of the drawings, the same or equivalent elements are denoted by the same reference symbols, and the redundant explanation thereof is omitted.

Figure 1:
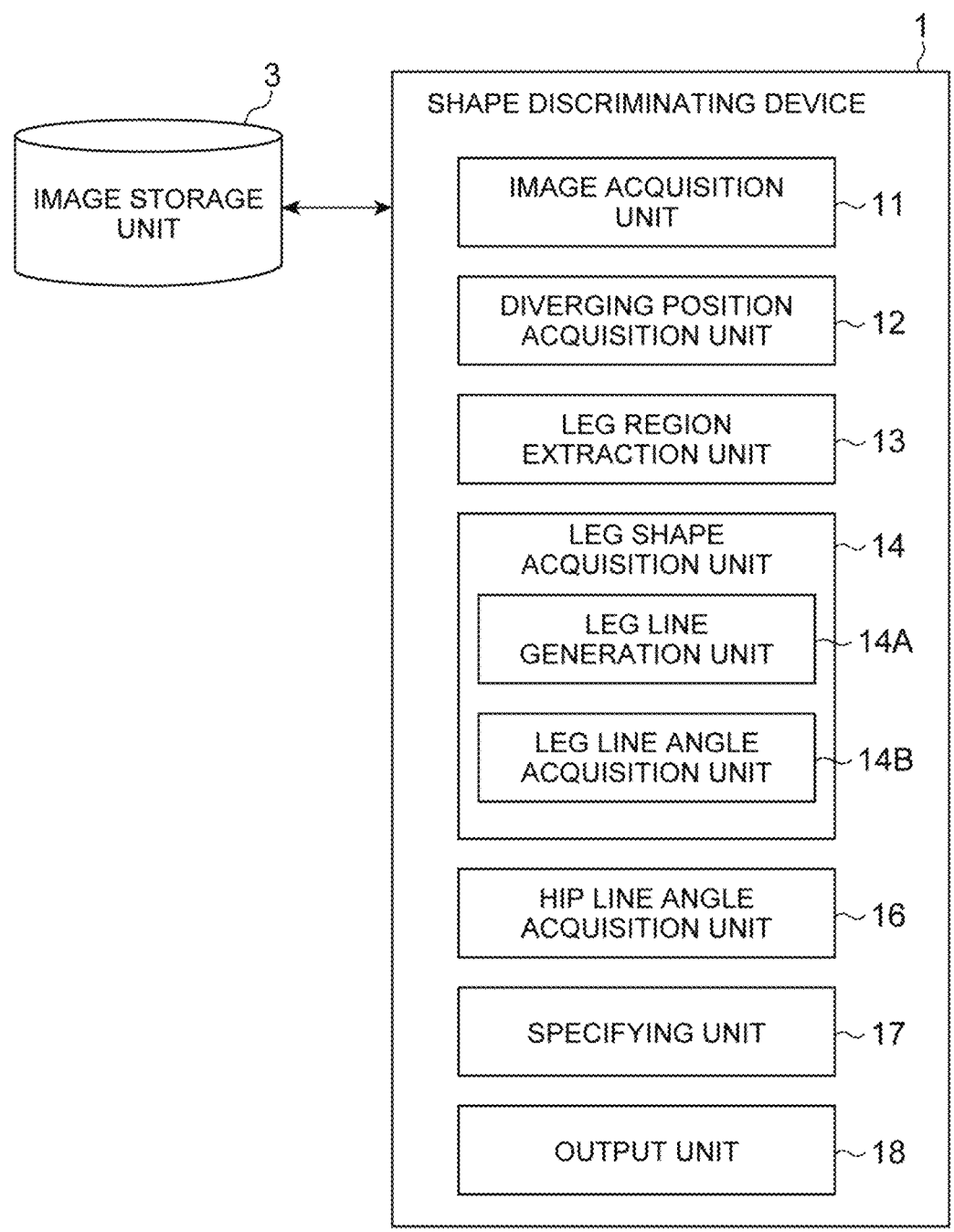
FIG. 1 is a block diagram showing the functional configuration of a shape discriminating device.

FIG. 1 is a block diagram showing the functional configuration of a shape discriminating device 1 according to this embodiment. The shape discriminating device 1 is a device that discriminates the shape of pants, which are a type of clothing shown in an image. As shown in FIG. 1, the shape discriminating device 1 can access an image storage unit 3. Note that the image storage unit 3 may be included in the shape discriminating device 1.

The shape discriminating device 1 may be a device on an electronic commerce site that receives, from a user, an order of a product that is sold through a network, for example, and it discriminates the shape of pants, which are a product sold thereon.

As shown in FIG. 1, the shape discriminating device 1 functionally includes an image acquisition unit 11 (image acquisition means), a diverging position acquisition unit 12 (diverging position acquisition means), a leg region extraction unit 13 (leg region extraction means), a leg shape acquisition unit 14 (leg shape acquisition means), a hip line angle acquisition unit 16 (hip line angle acquisition means), a specifying unit 17 (specifying means), and an output unit 18 (output means). The leg shape acquisition unit 14 may include a leg line generation unit 14A (leg line generation means), and a leg line angle acquisition unit 14B (leg line angle acquisition means).

Figure 2:
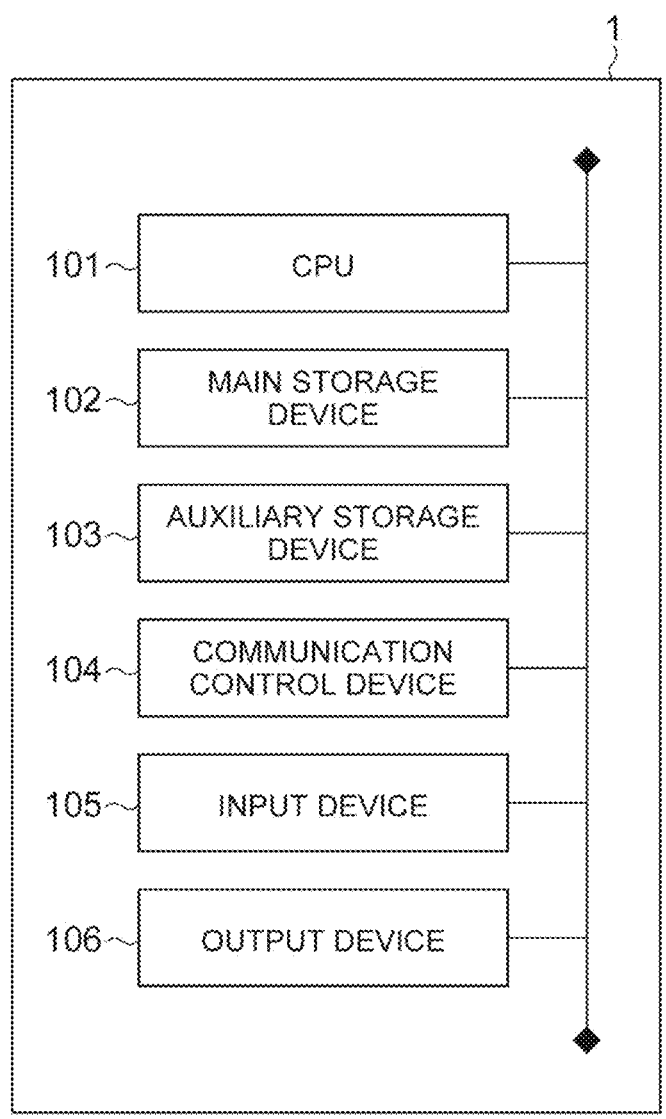
FIG. 2 is a view showing the hardware configuration of the shape discriminating device.

FIG. 2 is the hardware configuration diagram of the shape discriminating device 1. As shown in FIG. 2, the shape discriminating device 1 is physically configured as a computer system that includes a CPU 101, a main storage device 102 such as memory like RAM and ROM, an auxiliary storage device 103 such as a hard disk, a communication control device 104 such as a network card and the like. The shape discriminating device 1 may further include an input device 105 such as a keyboard and a mouse, an output device 106 such as a display and the like.

The functions shown in FIG. 1 are implemented by loading given computer software onto hardware such as the CPU 101 or the main storage device 102 shown in FIG. 2, making the communication control device 104 and the like operate under control of the CPU 101, and performing reading and writing of data in the main storage device 102 or the auxiliary storage device 103. Data and database required for the processing is stored in the main storage device 102 or the auxiliary storage device 103.

Prior to describing the functional units of the shape discriminating device 1, the image storage unit 3 is described with reference back to FIG. 2. Because an object to be discriminated is the shape of pants shown in an image in this embodiment, the image storage unit 3 stores a plurality of target images, which are images showing pants.

Figure 3:
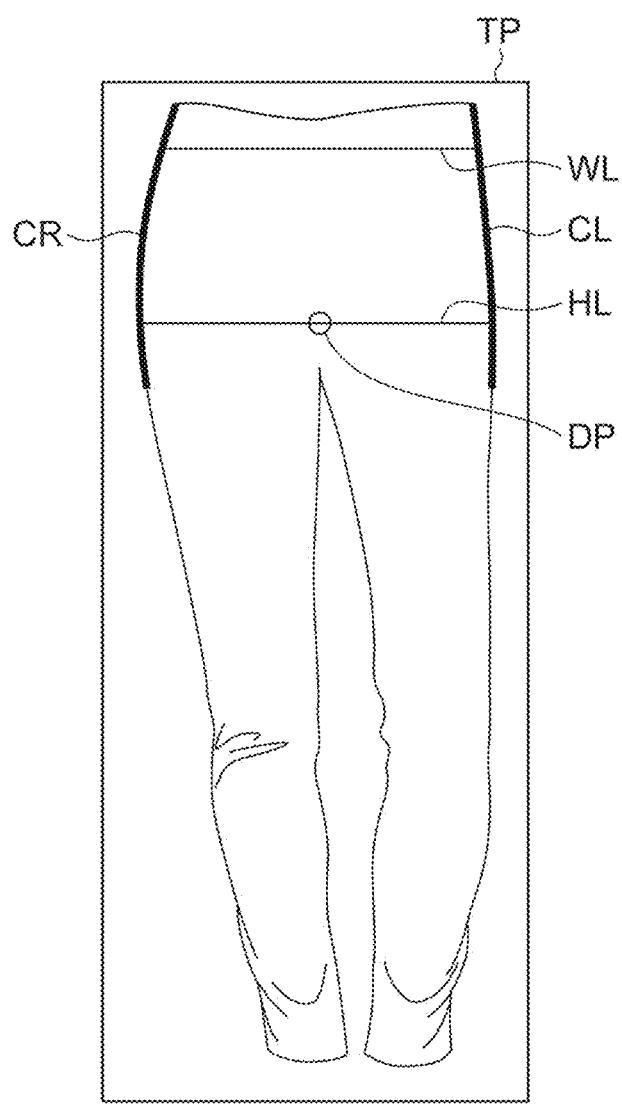
FIG. 3 is a view showing an example of a target image.

Referring again to FIG. 2, the functional units of the shape discriminating device 1 are described hereinafter. The image acquisition unit 11 acquires a target image. FIG. 3 is a view showing an example of a target image. As shown in FIG. 3, a pair of pants is shown in a target image TP.

The diverging position acquisition unit 12 acquires, as s diverging position, a position at which pants diverge into two leg parts or a position that can be regarded as a position at which pants diverge into two leg parts.

Specifically, the diverging position acquisition unit 12 acquires, from a target image, a single color region composed of a single color, for example. It is highly likely that pants are shown in this single color region. The diverging position acquisition unit 12 then acquires a diverging position from the single color region by using a template having the shape of a position at which pants diverge into two leg parts.

Further, the diverging position acquisition unit 12 detects the edge of the single color region and thereby acquires the contour of the single color region, and acquires a corner portion where the orientation of the contour changes by a specified angle or more. Then, the diverging position acquisition unit 12 may acquire, as the diverging position, a position in the acquired corner portion which is surrounded by the single color region over a specified angle (e.g., 180 degrees) or more.

Further, the diverging position acquisition unit 12 specifies, as the diverging position, a position at which the lateral width of the vertically oriented contour of the pants is greatest when the waist and hem of the pants are located at the top and bottom, respectively. Thus, the diverging position in this case is not the concept that specifies a single point in the target image TP but the concept that specifies a position in the vertical direction of the pants that is placed with the waist and hem located at the top and bottom, respectively, in the target image TP.

In this embodiment, an example in which the acquisition of leg shape information and the specification of the shape of pants are carried out based on the diverging position is described. The specification of the diverging position is described with reference to FIG. 3. The diverging position acquisition unit 12 extracts a region in which pants are shown from the target image TP. For example, the diverging position acquisition unit 12 recognizes a region in which pants are shown as a foreground region based on the pixel values of pixels that form the target image, and extracts the recognized foreground region from the target image TP. The extraction of a region showing a specified object such as pants can be done by various techniques known to those skilled in the art, and a technique called GrabCut may be used, for example.

The diverging position acquisition unit 12 extracts the contour of the region in which the pants are shown. Then, the diverging position acquisition unit 12 approximates each of the contours on both lateral sides of the pants by a quadratic curve. Various techniques can be applied to this approximation, and a technique called RANSAC may be used, for example. Specifically, in RANSAC, the diverging position acquisition unit 12 acquires the coordinates of arbitrary three points on a contour line representing one of the contours on both lateral sides of the pants. Based on the acquired coordinates of the three points, the diverging position acquisition unit 12 then calculates a quadratic curve by the least-squares method. The diverging position acquisition unit 12 then calculates a consensus indicating the degree of consistency between the calculated quadratic curve and the contour line. The consensus is the ratio of points present on the quadratic curve to all points that form the contour line.

The diverging position acquisition unit 12 repeats the extraction of arbitrary three points on a contour line and the calculation of a quadratic curve and a consensus, and sets the quadratic curve with the highest consensus among the calculated quadratic curves as a quadratic curve that approximates to one of the contours on both lateral sides of the pants. Likewise, the diverging position acquisition unit 12 calculates a quadratic curve that approximates to the other one of the contours on both lateral sides of the pants. In the example shown in FIG. 3, the diverging position acquisition unit 12 calculates quadratic curves CL and CR that approximate to the contours on both lateral sides of the pants.

Then, as shown in FIG. 3, the diverging position acquisition unit 12 acquires, as a diverging position DP, a position at which the distance between the quadratic curves CL and CR respectively corresponding to the contours on the left and right sides is greatest in the vertical direction of the pants placed with the waist and hem located at the top and bottom, respectively.

After the diverging position DP is specified, the diverging position acquisition unit 12 can specify a hip line HP that is drawn through the diverging position DP to the both lateral ends of the region showing the pants. Note that the specification of a waist position and a waist line WL based on the diverging position DP or the hip line HL is described later.

The leg region extraction unit 13 extracts a leg region from the region in which the pants are shown in the target image TP. The extraction of the leg region is specifically described with reference to FIGS. 4 to 8.

Figure 4:
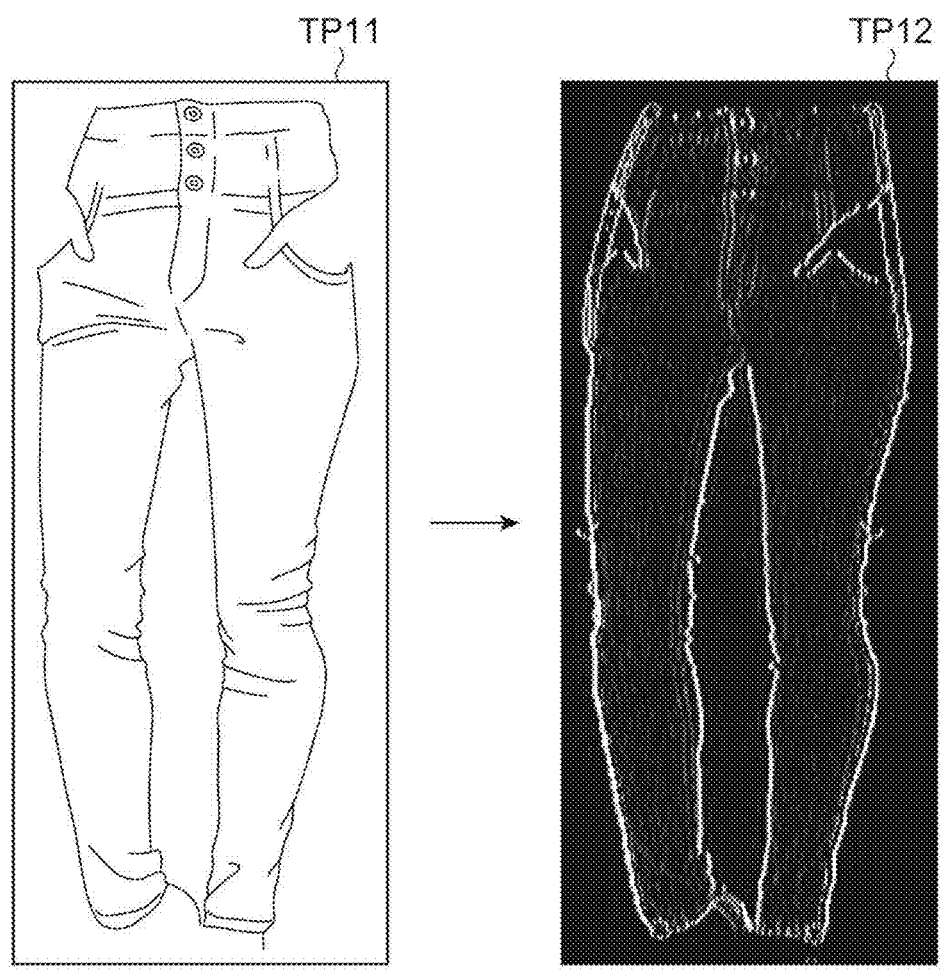
FIG. 4 is a view illustrating an example of preprocessing for extraction of a leg region.

FIG. 4 is a view illustrating an example of preprocessing for extraction of a leg region. A target image TP11 is shown in FIG. 4. In the target image TP11, pants are placed with the waist and hem located at the top and bottom, respectively. The leg region extraction unit 13 extracts the contour running in the longitudinal direction of the pants from the target image TP11 and generates a contour image TP12.

An example of the generation of the contour image TP12 is specifically described hereinbelow. First, the leg region extraction unit 13 performs contour extraction processing on an image that represents the target image TP11 in gray scale and thereby generates a first contour image. For the contour extraction processing, a known filter for contour detection called a Sobel filter may be used, for example. The Sobel filter is a filter that detects a contour by calculating the spatial first order derivative of an image to be processed. In the Sobel filter, the direction of the derivative can be set by a parameter according to the direction of the contour to be detected and, in this embodiment, it is preferable to set a parameter for enhancing and recognizing the contour running vertically.

Further, the leg region extraction unit 13 performs contour extraction processing on an image represented by the brightness component among the pixels that form the target image TP11 and thereby generates a second contour image. In the case where the target image TP11 is represented by pixel values in the HSV color space, the contour extraction processing is performed only on an image represented only by the V component.

Furthermore, the leg region extraction unit 13 performs contour extraction processing on a binarized image of the target image TP11 and thereby generates a third contour image. After that, the leg region extraction unit 13 combines the first to third contour images and thereby generates the contour image TP12. As shown in FIG. 4, the contours in the longitudinal direction of the pants are enhanced in the contour image TP12.

Figure 5:
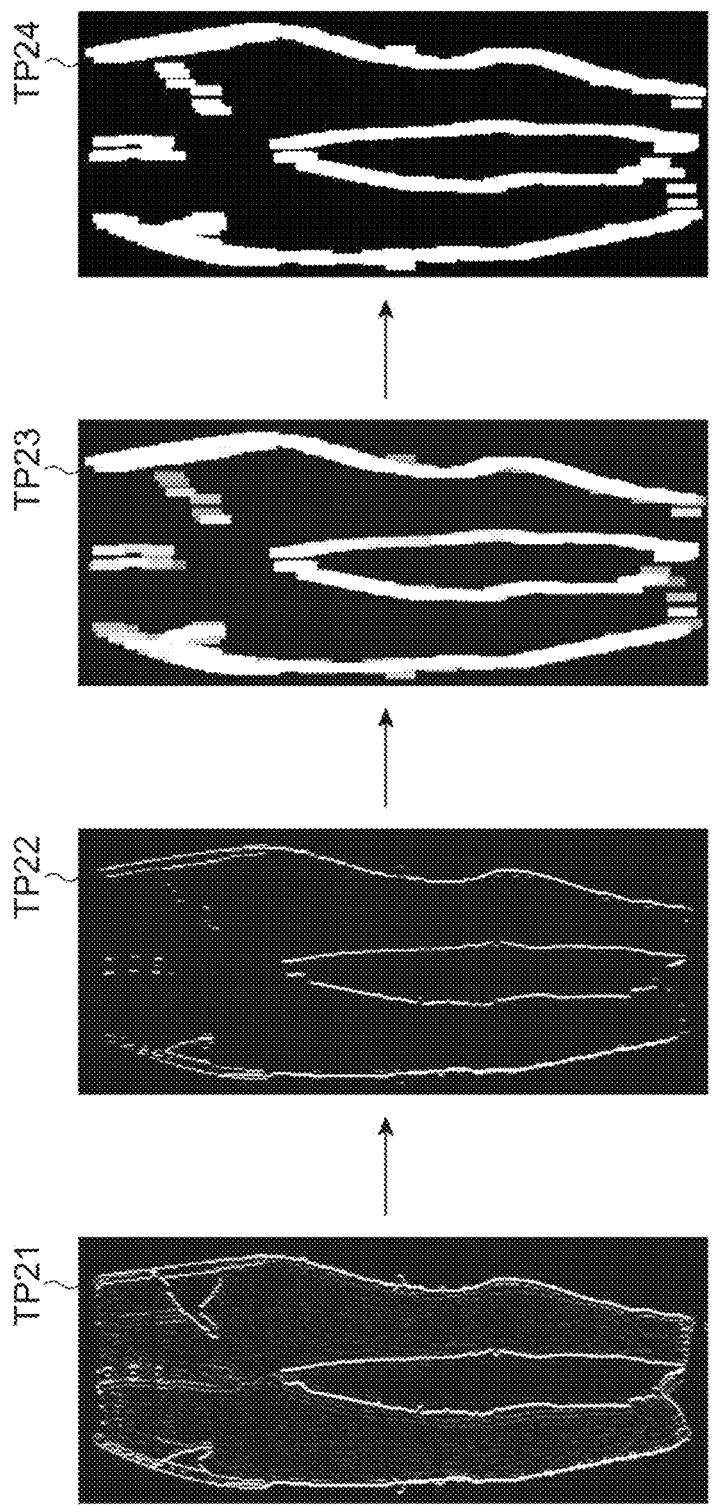
FIG. 5 is a view illustrating robust processing for further enhancing a contour in a contour image.

FIG. 5 is a view illustrating robust processing for further enhancing the contours in the contour image TP12. A contour image TP21 in FIG. 5 is the contour image TP12 that is obtained by the contour extraction processing described with reference to FIG. 4. The leg region extraction unit 13 performs processing by a known morphological filter on the contour image TP21 and thereby generates contour images TP22 and TP23.

Specifically, the leg region extraction unit 13 performs erosion processing on the contour image TP21 and thereby generates a contour image TP22. In the erosion processing, a region of a group of pixels that form the contour shown in the contour image TP21 is contracted, and therefore microregions that are smaller than a certain size disappear among the regions that form the contour. Noise in the contour image TP21 is thereby eliminated.

Then, the leg region extraction unit 13 performs dilation processing on the contour image TP22 and thereby generates a contour image TP23. In the dilation processing, a group of pixels that form the contour are expanded, and therefore an image where the contour of pants is enhanced in bold is obtained. After that, the leg region extraction unit 13 performs binarization processing on the contour image TP23 and thereby generates a contour image TP24. Thus, in the contour image TP24, the region showing the contour of the pants is shown in white.

Figure 6:
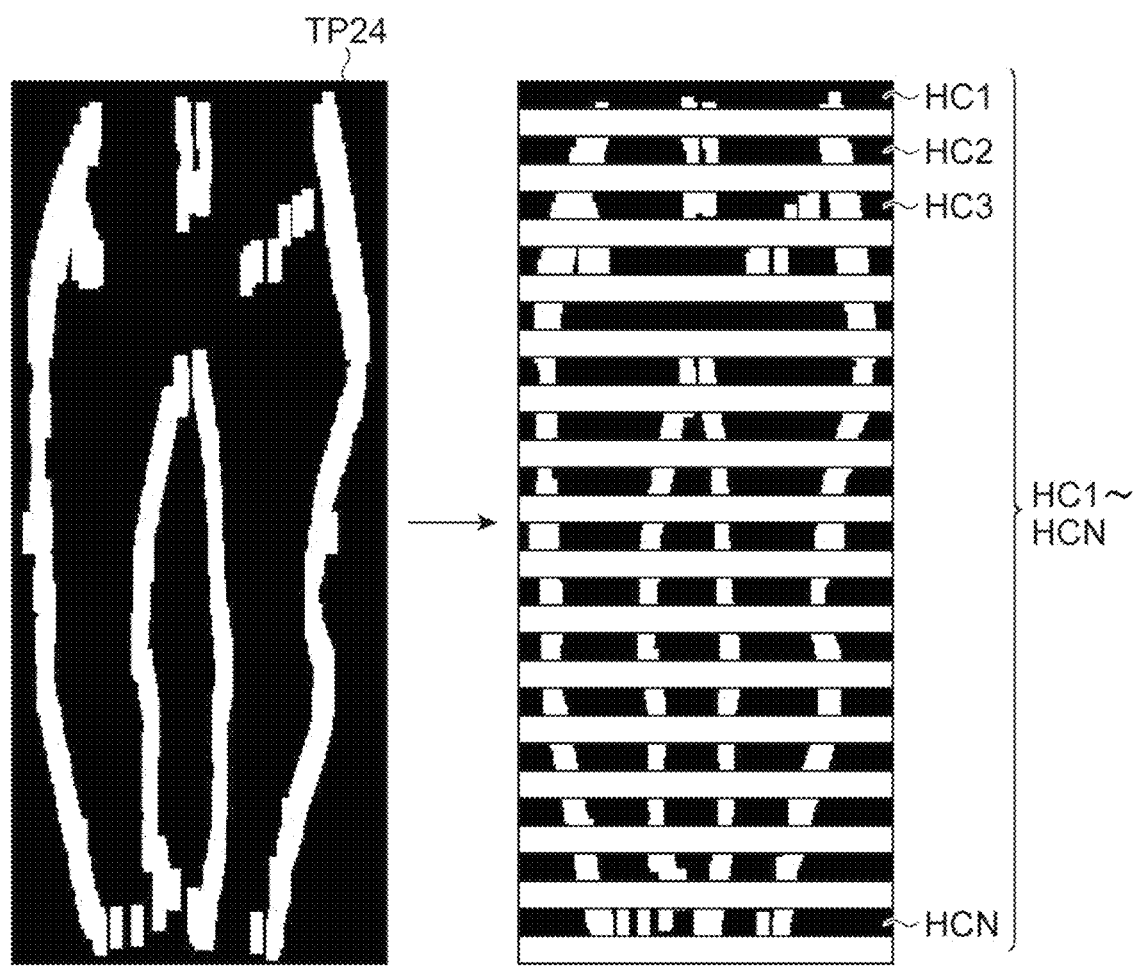
FIG. 6 is a view illustrating generation of a horizontally segmented image HC based on a contour image.

FIG. 6 is a view illustrating generation of a horizontally segmented image HC based on the contour image TP24. The leg region extraction unit 13 horizontally segments the contour image TP24 and thereby generates horizontally segmented images HC1 to HCN, each having a length of 10 pixels vertically, for example.

Figure 7:
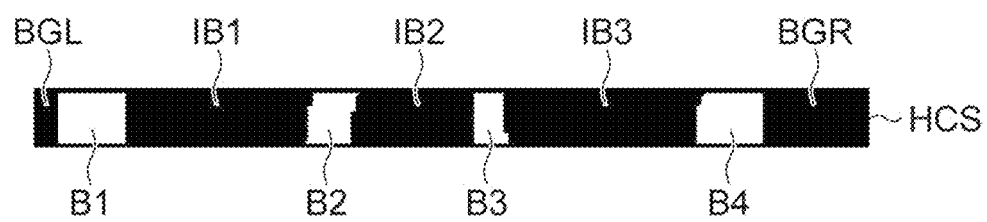
FIG. 7 is a view showing processing for extracting a cell region that is likely to show a leg part based on a horizontally segmented image.

FIG. 7 is a view showing processing for extracting a cell region that is likely to show a leg part based on the horizontally segmented image. The leg region extraction unit 13 acquires one horizontally segmented image HCS among the horizontally segmented images HC1 to HCN as shown in FIG. 7. The leg region extraction unit 13 traces the horizontally segmented image HCS from the left end toward the right, detecting a change in color (white or black).

First, the leg region extraction unit 13 detects, as a background region BGL, a black region that continues from the left end of the horizontally segmented image HCS. Next, the leg region extraction unit 13 detects, as an internal boundary B1, a white region from the position at which the color changes from black to white to the next position at which the color changes from white to black. Then, the leg region extraction unit 13 detects, as a substantial region IB1, a black region from the position at which the color changes from white to black to the next position at which the color changes from black to white.

Likewise, the leg region extraction unit 13 detects white regions and black regions as internal boundaries B2 to B4 and substantial region IB3, each time the color changes. Further, the leg region extraction unit 13 detects, as a background region BGR, a black region at the right end of the horizontally segmented image HCS.

Then, the leg region extraction unit 13 extracts the substantial regions IB and the internal boundaries B from all of the horizontally segmented images HC1 to HCN or the horizontally segmented images located below the diverging position, and acquires the substantial regions IB in each horizontally segmented image HC as a cell in which a leg part is likely to be shown.

Figure 8:
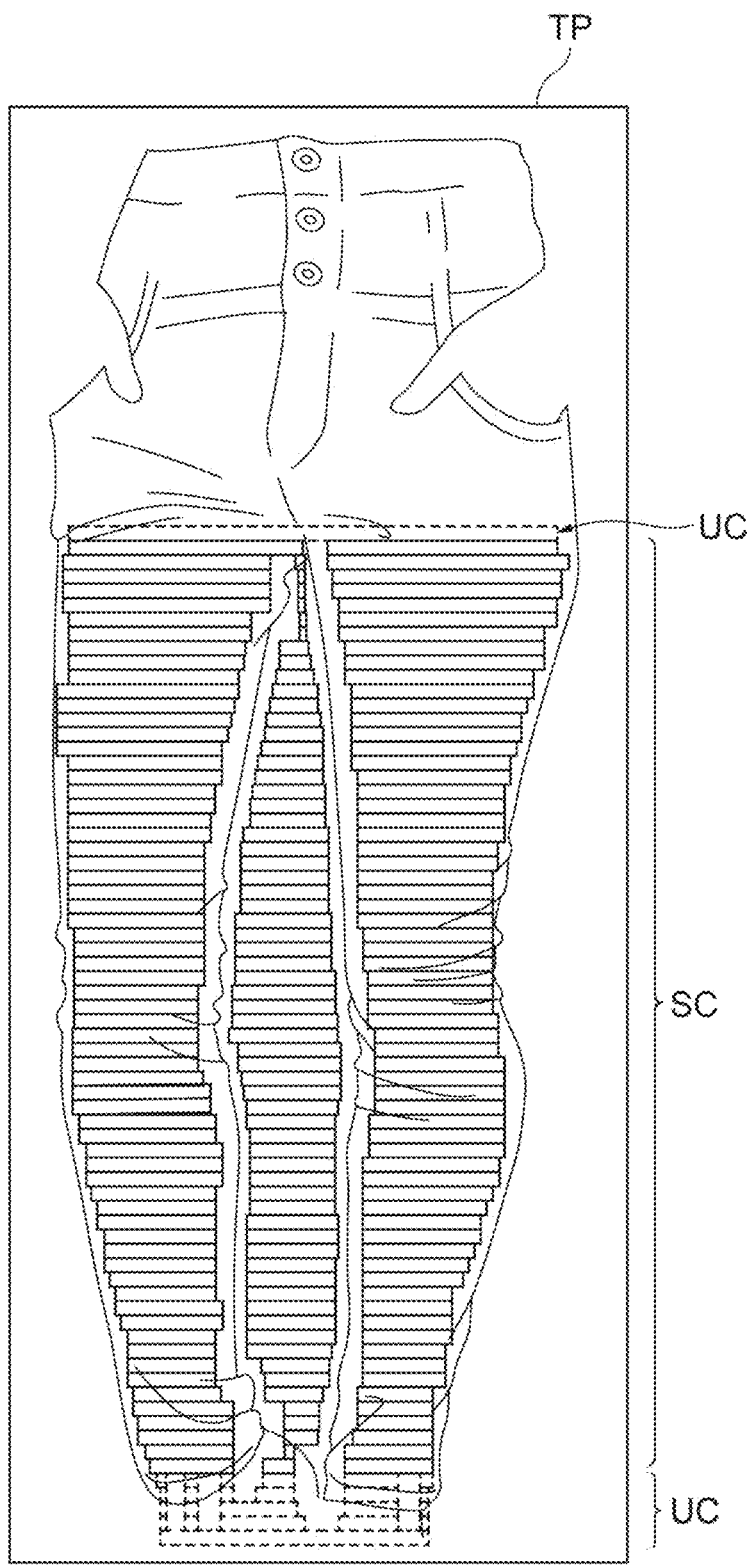
FIG. 8 is a view showing an example of a target image on which cells are superimposed.

FIG. 8 is a view showing an example of a target image on which cells are superimposed. In FIG. 8, a cell is represented by a rectangle with a solid or dashed line. The leg region extraction unit 13 extracts, as a leg region, at least one region in the region showing the pants and separable into the left leg region and the right leg region respectively corresponding to left and right legs.

Specifically, the leg region extraction unit 13 extracts a region where two or three cells are detected from one horizontally segmented image as a stable cell region SC. To be more specific, it is highly probable that, when two cells are detected at the same height of the pants shown in the target image, the two cells correspond to the left leg and the right leg, respectively, and when three cells are detected, the cells at both ends correspond to the left and right legs, respectively, and therefore the stable cell region SC can be regarded as a region showing the pants and separable into the left leg region and the right leg region respectively corresponding to the left and right legs. Then, the leg region extraction unit 13 extracts, as the leg region, at least one of regions composed of cells corresponding to any one of the left leg and the right leg in the stable cell region SC.

In other words, because a region that can be separated into the left leg region and the right leg region respectively corresponding to the left and right legs in the region showing the pants in the target image is a candidate for the leg region, a region that is likely to show the leg part in the pants can be extracted as the leg region.

Note that the leg region extraction unit 13 may extract, as the leg region, a region where a difference in width between the left leg region and the right leg region, which correspond to each other at the same vertical height, is a specified value or less in the region showing the pants and separable into the left leg region and the right leg region.

Thus, when a difference in width between cells corresponding to the left leg and the right leg among the two or three cells detected at the same height of the pants shown in the target image is a specified value or less, the leg region extraction unit 13 may extract, as the stable cell region SC, the region composed of such cells. The specified value for a difference in width between the cells is set in advance, for example, and it is set to such a value that a cell corresponding to the left leg and a cell corresponding to the right leg are recognized to have substantially the same width.

If a difference in width between the left leg region and the right leg region extracted and separated from the target image is large, those regions are not likely to correctly reflect the shape of the leg parts of the pants. Because a region where a difference in width between the left leg region and the right leg region is a specified value or less is extracted as the leg region as described above, it is possible to extract, as the leg region, a region that is likely to more correctly reflect the shape of the leg part of the pants.

On the other hand, the leg region extraction unit 13 extracts, as an unstable cell region UC, a region where one cell or four or more cells are detected horizontally, and does not use the unstable cell region UC for detection of the leg region.

Figure 9:
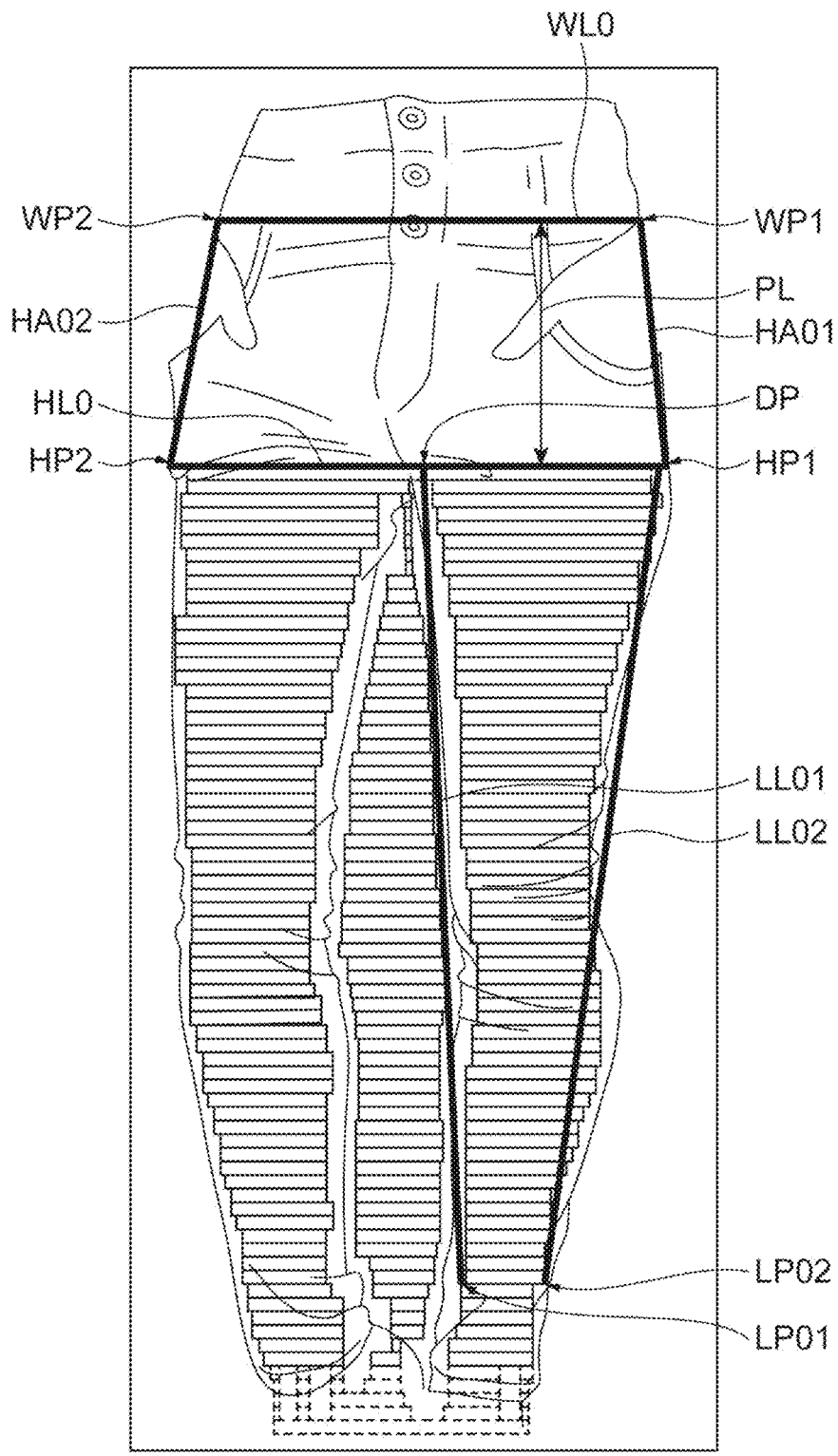
FIG. 9 is a view showing an example of extraction of a leg region and generation of a leg line.

FIG. 9 is a view showing an example of extraction of a leg region and generation of a leg line. The leg region extraction unit 13 extracts, as the leg region, at least one of a region composed of cells corresponding to the left leg and a region composed of cells corresponding to the right leg among a plurality of cells included in the stable cell region SC (FIG. 8). In the example shown in FIG. 9, the leg region extraction unit 13 extracts, as the leg region, a region composed of cells corresponding to the left leg.

The leg shape acquisition unit 14 acquires leg shape information concerning variation in lateral width of the leg part of the pants based on the diverging position and the leg region. The leg shape acquisition unit 14 according to this embodiment includes a leg line generation unit 14A and a leg line angle acquisition unit 14B.

The leg line generation unit 14A generates first and second leg lines based on the leg region and the hip line. Specifically, as shown in FIG. 9, the leg line generation unit 14A specifies a hip line HL0 that is drawn through the diverging position DP to the both lateral ends of the region showing the pants. Then, the leg line generation unit 14A generates a first leg line LL01 that connects the diverging position DP, which is the center of the hip line HL0, and a lower inner portion LP01 of the leg region. Further, the leg line generation unit 14A generates a second leg line LL02 that connects a lower outer portion LP02 of the leg region and an end portion HP1, which is one corresponding to the lower outer portion LP02 out of the both end portions HP1 and HP2 of the hip line HL0.

The leg line angle acquisition unit 14B acquires a leg line angle, which is the angle between the first leg line and the second leg line. In the example shown in FIG. 9, the leg line angle acquisition unit 14B acquires, as the leg line angle, the angle between the first leg line LL01 and the second leg line LL02. To be more specific, the leg line angle acquisition unit 14B acquires, as the leg line angle, the smaller one of the two angles made by the first leg line LL01 and the second leg line LL02, which are two straight lines, relative to each other Further, instead of generating the leg line and acquiring the leg line angle, the leg shape acquisition unit 14 may acquire, as leg shape information, a thigh width, which is a length from the center to one end of the hip line drawn through the diverging position to the both lateral ends of the region showing the pants, and a hem width, which is a width at the lower end of a region corresponding to one of the two legs in the leg region.

The hip line angle acquisition unit 16 acquires a hip line angle, which is the angle between a left hip line and a right hip line obtained by connecting the left and right ends of a waist line and the left and right ends of a hip line, respectively.

Specifically, the hip line angle acquisition unit 16 specifies a waist position of the pants based on the diverging position DP. The waist position may be specified as a position located upper than the diverging position DP by a specified length PL. The specified length PL may be obtained by multiplying the length of the hip line HL0 by a specified coefficient. Then, the hip line angle acquisition unit 16 can specify a waist line WL0 that is drawn through the waist position to the both lateral ends of the region showing the pants.

The hip line angle acquisition unit 16 specifies a left hip line HA01 and a right hip line HA02 based on the hip line HL0 and the waist line WL0. Specifically, the hip line angle acquisition unit 16 acquires the left hip line HA01 by connecting a left end HP1 of the hip line HL0 and a left end WP1 of the waist line WL0. Further, the hip line angle acquisition unit 16 acquires the right hip line HA02 by connecting a right end HP2 of the hip line HL0 and a right end WP2 of the waist line WL0. Then, the hip line angle acquisition unit 16 acquires, as the hip line angle, the angle between the left hip line HA01 and the right hip line HA02. Note that the hip line angle acquisition unit 16 acquires, as the hip line angle, the smaller one of the two angles made by the left hip line HA01 and the right hip line HA02, which are two straight lines, relative to each other.

Figure 10:
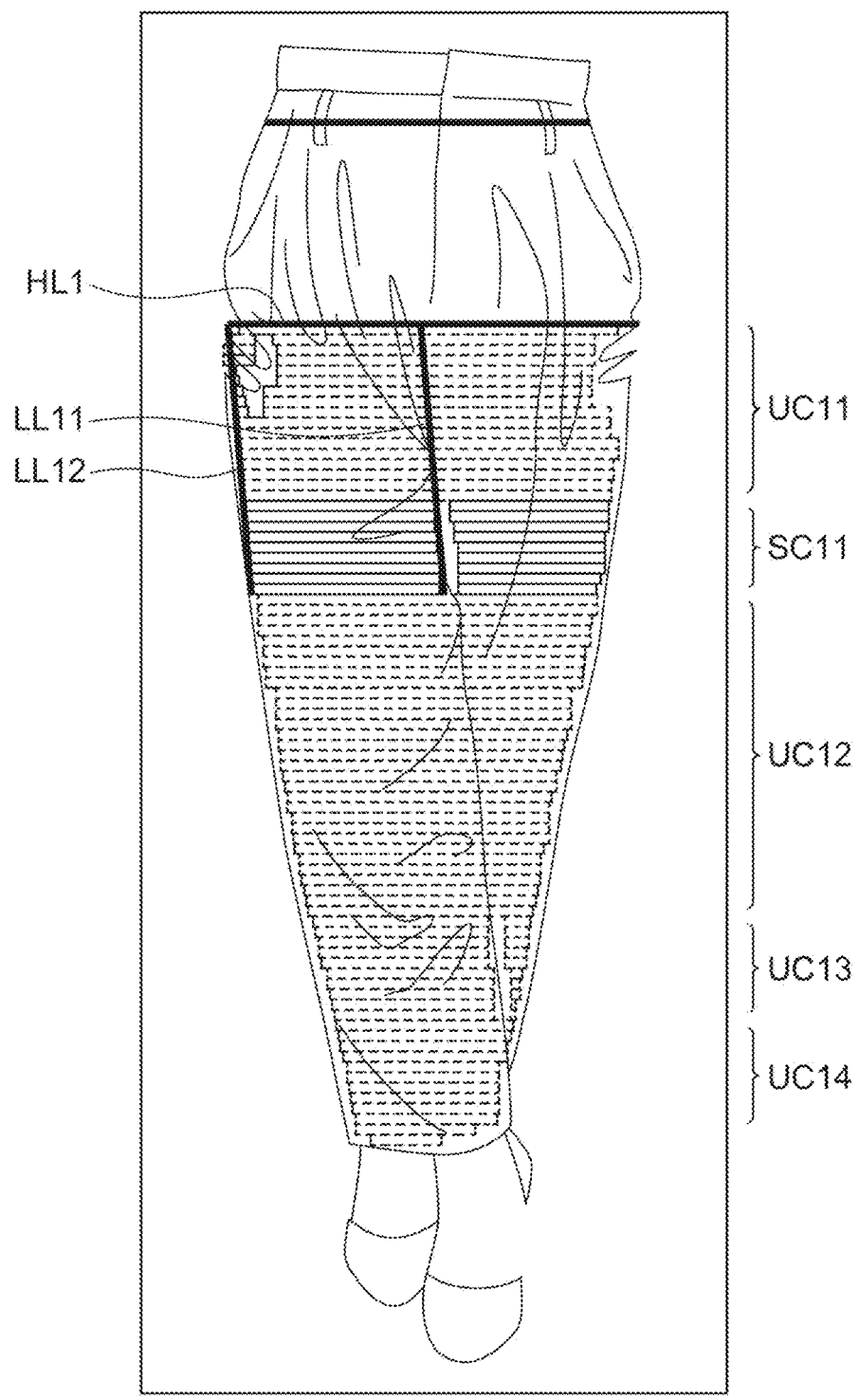
FIG. 10 is a view showing an example of extraction of a leg region and generation of a leg line.

FIG. 10 is a view showing an example of extraction of a leg region and generation of a leg line. In the example shown in FIG. 10, the leg region extraction unit 13 extracts a stable cell region SC11 and unstable cell regions UC11, UC12, UC13 and UC14 based on the acquired cells. In the stable cell region SC11, two cells are detected at the same height of the pants shown in the target image, and a difference in width between the two cells is a specified value or less, and therefore the leg region extraction unit 13 detects a region composed of those cells as the stable cell region.

In the unstable cell regions UC11, UC12, and UC14, a model wearing pants stands with legs crossed, and only one cell is detected at the same height of the pants shown in the target image, and therefore the leg region extraction unit 13 detects a region composed of those cells as the unstable cell region. In the unstable cell region UC13, although two cells are detected at the same height of the pants shown in the target image, a difference in width between the two cells exceeds a specified value, and therefore the leg region extraction unit 13 detects a region composed of those cells as the unstable cell region.

The leg region extraction unit 13 compares the width of cells corresponding to the left leg and the right leg in the stable cell region SC11. Because the width of the cell corresponding to the right leg is larger than the width of the cell corresponding to the left leg, the leg region extraction unit 13 extracts, as the leg region, a region composed of the cells corresponding to the right leg in the stable cell region SC11. Then, the leg line generation unit 14A generates a first leg line LL11 and a second leg line LL12 based on the extracted leg region and the hip line HL1.

Figure 11:
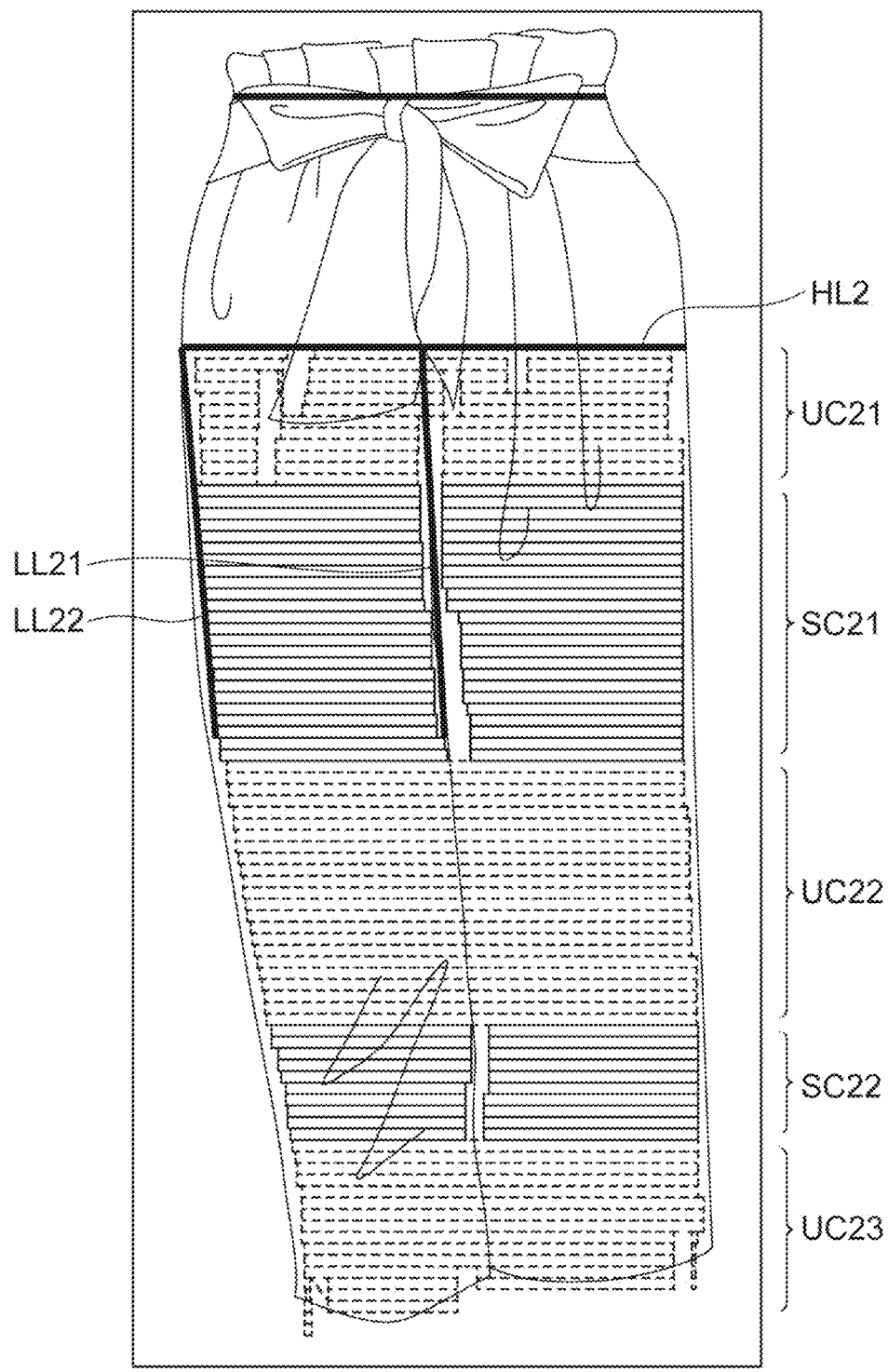
FIG. 11 is a view showing an example of extraction of a leg region and generation of a leg line.

FIG. 11 is a view showing an example of extraction of a leg region and generation of a leg line. In the example shown in FIG. 11, the leg region extraction unit 13 extracts stable cell regions SC21 and SC22 and unstable cell regions UC21, UC22 and UC23 based on the acquired cells. In the stable cell regions SC21 and SC22, two cells are detected at the same height of the pants shown in the target image, and a difference in width between the two cells is a specified value or less, and therefore the leg region extraction unit 13 detects a region composed of those cells as the stable cell region.

In the unstable cell regions UC21, UC22 and UC23, only one cell or four or more cells are detected at the same height of the pants shown in the target image due to the position of the leg part of the pants, the shadow of the image and the like. Further, even when two or three cells are detected, a difference in width between the cells respectively corresponding to the left leg and the right leg exceeds a specified value. Therefore the leg region extraction unit 13 detects a region composed of those cells as the unstable cell region.

The leg region extraction unit 13 extracts, as the leg region, a region with the longest vertical length in the region showing the pants and separable into the left leg region and the right leg region, such as the stable cell regions SC21 and SC22. To be specific, the leg region extraction unit 13 extracts, as a candidate for the leg region, a region composed of the cells of the stable cell region SC21 with the longer vertical length between the stable cell regions SC21 and SC22. It is thereby possible to extract, as the leg region, a region that is likely to more appropriately reflect the characteristics of the shape of the leg part of the pants shown in the target image.

Further, the leg region extraction unit 13 compares the width of the cells respectively corresponding to the left leg and the right leg in the stable cell region SC21. Because the width of the cell corresponding to the right leg is larger than the width of the cell corresponding to the left leg, the leg region extraction unit 13 extracts, as the leg region, a region composed of the cells corresponding to the right leg in the stable cell region SC21.

In the region of the leg part of the pants shown in the target image, an image of the wider region is likely to be taken from the position closer to the front. By extracting, as the leg region, the region with the wider width between the left leg region and the right leg region corresponding to each other at the same vertical height as described above, it is possible to extract, as the leg region, a region that is likely to more accurately reflect the shape of the leg part of the pants, and it is thereby possible to accurately discriminate the shape of the pants.

Then, the leg line generation unit 14A generates a first leg line LL21 and a second leg line LL22 based on the extracted leg region and the hip line HL2.

The specifying unit 17 specifies the shape of the pants based on the leg shape information acquired by the leg shape acquisition unit 14. Note that, in this embodiment, an example of the case where the specifying unit 17 acquires, as the leg shape information, the leg line angle acquired by the leg line angle acquisition unit 14B is described in detail below. The specifying unit 17 may specify the shape of the pants based on the hip line angle acquired by the hip line angle acquisition unit 16 and the leg shape information. A specific example of specifying the shape of the pants is described in detail later in the description of the flowcharts of FIGS. 12 and 13.

The output unit 18 outputs information about the shape of the pants specified by the specifying unit 17. To be specific, the output unit 18 may store information about the shape of the pants shown in the target image as the attributes of this image in association with the image into a specified storage means (for example, the image storage unit 3). Further, the output unit 18 may perform control to display information about the shape of the pants shown in the target image in association with this target image on a display. Furthermore, the output unit 18 may classify a plurality of images stored in the image storage unit 3 based on information about the shape of the pants shown in the target image.

Figure 12:
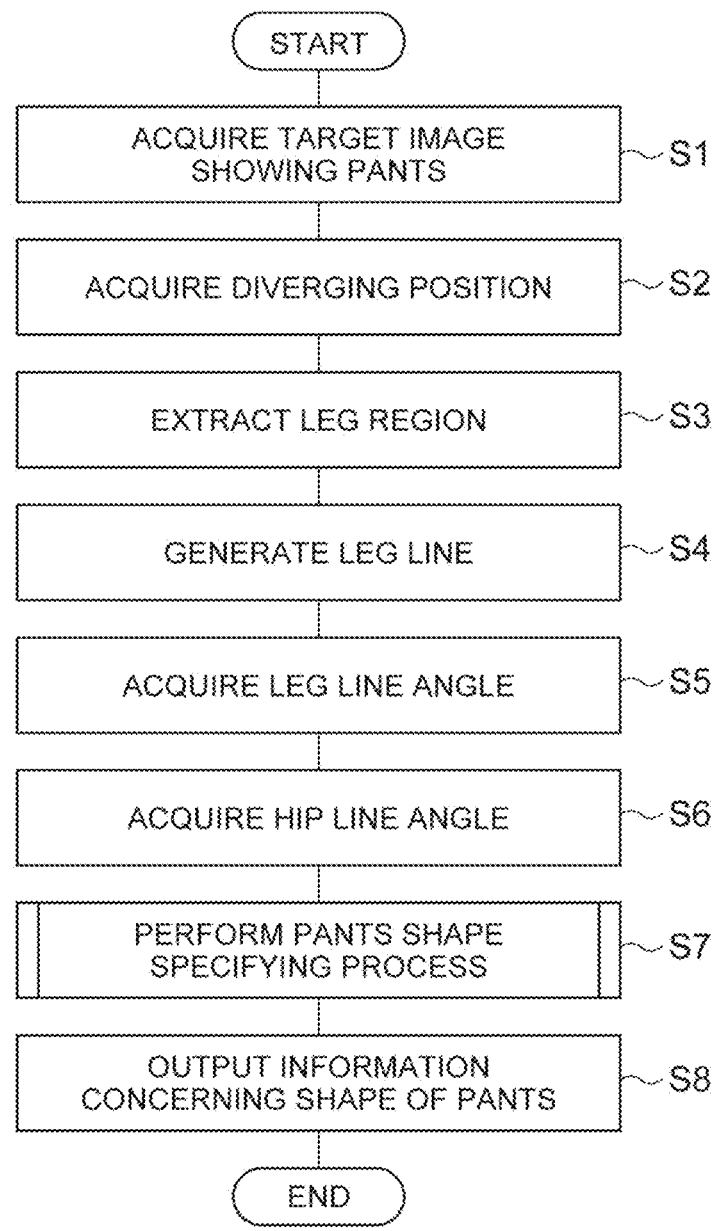
FIG. 12 is a flowchart showing a process of a shape discriminating method performed in the shape discriminating device.

The operation of the shape discriminating device 1 according to this embodiment is described hereinafter with reference to FIG. 12. FIG. 12 is a flowchart showing a process of a shape discriminating method performed in the shape discriminating device 1.

First, the image acquisition unit 11 acquires a target image in which pants are shown (S1). Specifically, the image acquisition unit 11 acquires a target image in which pants are shown from the image storage unit 3, for example. Next, the diverging position acquisition unit 12 acquires a diverging position, which is a position at which the pants diverge into two leg parts in the target image (S2). Specifically, the diverging position acquisition unit 12 specifies, as the diverging position, a position at which the lateral width is largest in the vertical direction of the contour of the pants when the waist and hem of the pants are located at the top and bottom, respectively.

Then, the leg region extraction unit 13 extracts a leg region from the region in which the pants are shown in the target image TP (S3). Specifically, the leg region extraction unit 13 extracts, as the leg region, at least one region in the region showing the pants in the target image and separable into the left leg region and the right leg region respectively corresponding to left and right legs.

Then, the leg line generation unit 14A of the leg shape acquisition unit 14 generates first and second leg lines based on the leg region and a hip line (S4). Specifically, the leg line generation unit 14A generates, as the first leg line, a line connecting from the center of the hip line drawn through the diverging position to the both lateral ends of the region showing the pants to the inner portion at the lower end of the leg region, and generates, as the second leg line, a line connecting from the outer portion at the lower end of the leg region to one end of the hip line corresponds to the outer portion. The leg line angle acquisition unit 14B of the leg shape acquisition unit 14 then acquires a leg line angle, which is the angle between the first leg line and the second leg line (S5).

The hip line angle acquisition unit 16 acquires a hip line angle, which is the angle between a left hip line and a right hip line obtained by connecting the left and right ends of the waist line and the left and right ends of the hip line, respectively (S6).

After that, the specifying unit 17 performs a specifying process for specifying the shape of the pants based on the leg line angle acquired by the leg line angle acquisition unit 14B in Step S5 (S7). The specifying unit 17 may perform the specifying process by further using the hip line angle acquired by the hip line angle acquisition unit 16 in Step S6.

Figure 13:
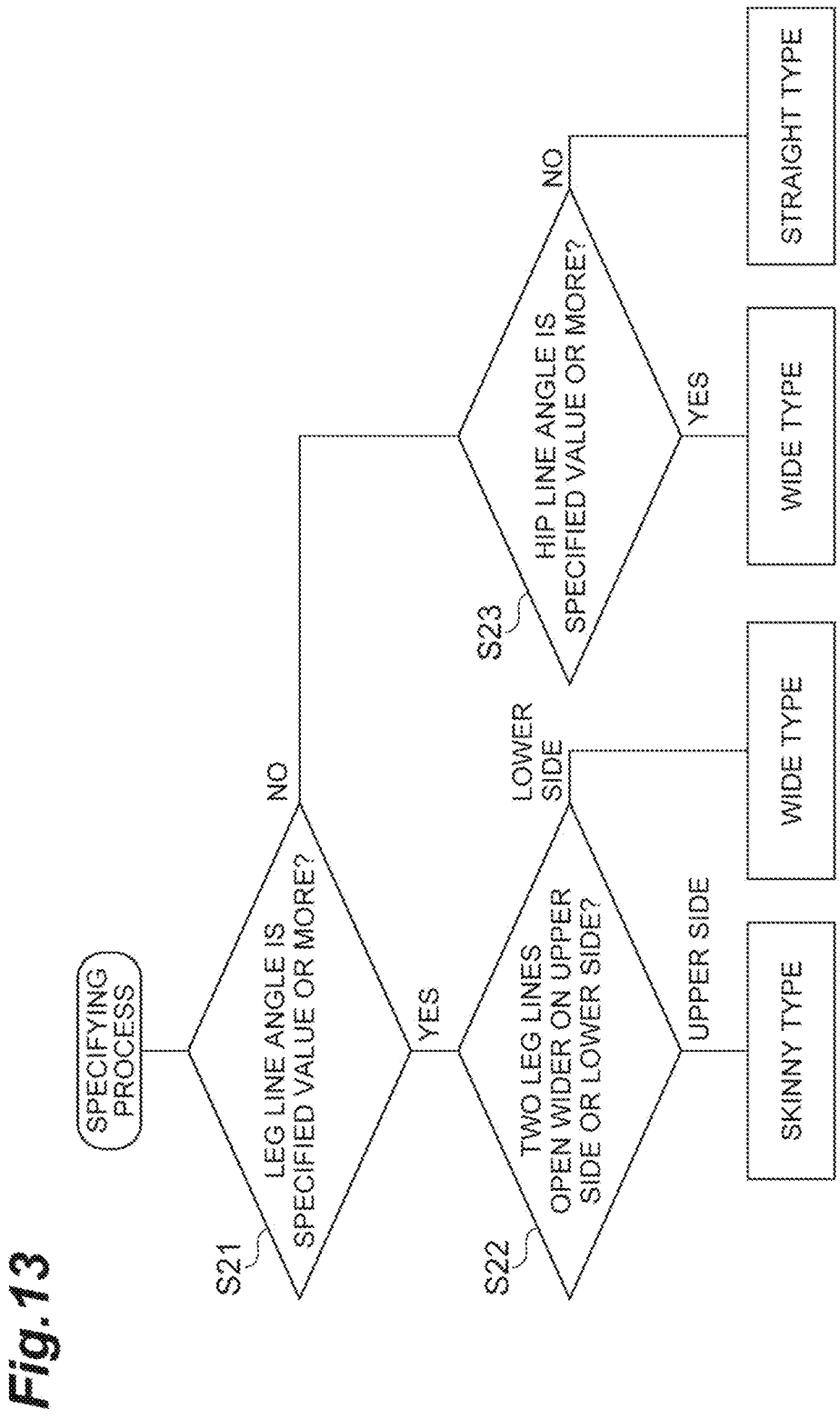
FIG. 13 is a flowchart showing a specifying process in Step S7 of the flowchart in FIG. 12.

FIG. 13 is a flowchart showing the specifying process in Step S7 of the flowchart in FIG. 12. In the specifying process, the specifying unit 17 determines whether the leg line angle is a specified value or more (S21). The specified value for determining the leg line angle is set in advance, for example. When it is determined that the leg line angle is a specified value or more, the process proceeds to Step S22. On the other hand, when it is not determined that the leg line angle is a specified value or more, the process proceeds to Step S23.

In Step S22, the specifying unit 17 determines which of the upper side and the lower side of the two leg lines opens wider than the other (S22). Specifically, when the distance between the upper ends of the two leg lines is larger than the distance between the lower ends of the two leg lines, the specifying unit 17 determines that the upper side of the two leg lines opens wider. On the other hand, when the distance between the upper ends of the two leg lines is smaller than the distance between the lower ends of the two leg lines, the specifying unit 17 determines that the lower side of the two leg lines opens wider.

When it is determined that the upper side of the two leg lines opens wider, the specifying unit 17 determines that the shape of the pants shown in the target image is a skinny type. On the other hand, when it is determined that the lower side of the two leg lines opens wider, the specifying unit 17 determines that the shape of the pants shown in the target image is a wide type.

In Step S23, the specifying unit 17 determines whether the hip line angle is a specified value or more (S23). Specifically, when the hip line angle is a specified value or more, the length of the hip line HL is longer than the length of the waist line WL of the pants, and therefore the specifying unit 17 determines that the shape of the pants shown in the target image is a wide type.

On the other hand, when the hip line angle is not a specified value or more, a difference between the length of the waist line WL and the length of the hip line HL of the pants is small, and therefore the specifying unit 17 determines that the shape of the pants shown in the target image is a straight type. Note that the specified value for determining the hip line angle is set in advance, for example.

Because the characteristics of the shape of the pants appear in the contour from the waist line part to the hip line part of the pants, the shape of the pants is reflected on the hip line angle. Further, because the shape of the pants is specified based on the hip line angle, it is possible to specify and discriminate the shape of the pants in detail without comparison with a template.

For example, when the target image shown in FIG. 9 is acquired, the specifying unit 17 determines in Step S21 that the leg line angle, which is the angle between the first leg line LL01 and the second leg line LL02, is a specified value or more. Then, in Step S22, because the upper side of the first leg line LL01 and the second leg line angle LL02 opens wider, the specifying unit 17 determines that the shape of the pants shown in the target image of FIG. 9 is a skinny type.

Figure 14:
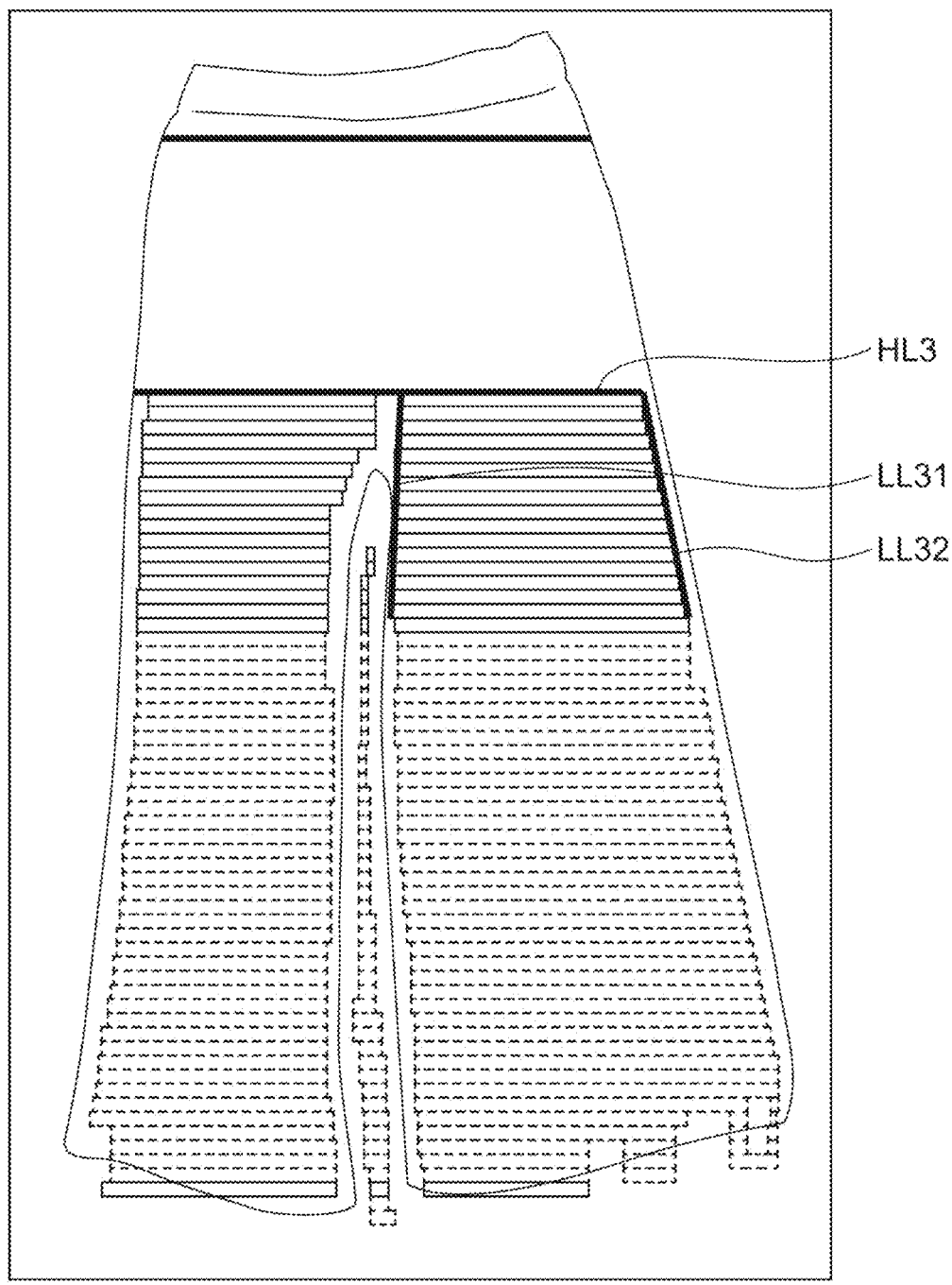
FIG. 14 is a view showing an example of specifying the shape of pants.

For example, when the target image shown in FIG. 14 is acquired, the specifying unit 17 determines in Step S21 that the leg line angle, which is the angle between the first leg line LL31 and the second leg line LL32, is a specified value or more. Then, in Step S22, because the lower side of the first leg line LL31 and the second leg line angle LL32 opens wider, the specifying unit 17 determines that the shape of the pants shown in the target image of FIG. 14 is a wide type.

Figure 15:
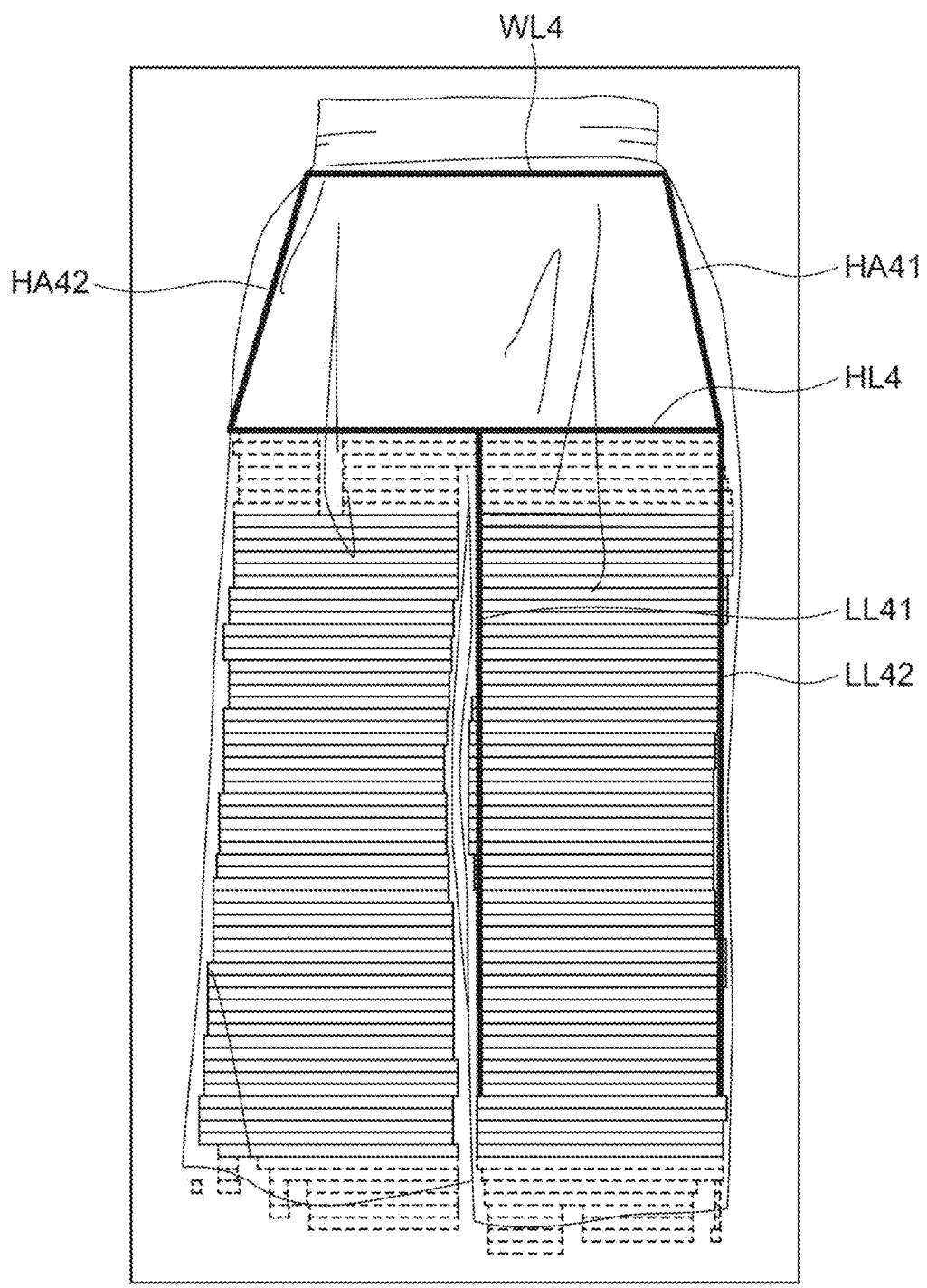
FIG. 15 is a view showing an example of specifying the shape of pants.

For example, when the target image shown in FIG. 15 is acquired, the specifying unit 17 determines in Step S21 that the leg line angle, which is the angle between the first leg line LL41 and the second leg line LL42, is not a specified value or more. Then, in Step S23, because the hip line angle, which is the angle between the left hip line HA41 and the right hip line HA42 obtained by connecting the left and right ends of the waist line WL4 and the left and right ends of the hip line HL4, respectively, is a specified value or more, the specifying unit 17 determines that the shape of the pants shown in the target image of FIG. 15 is a wide type.

Figure 16:
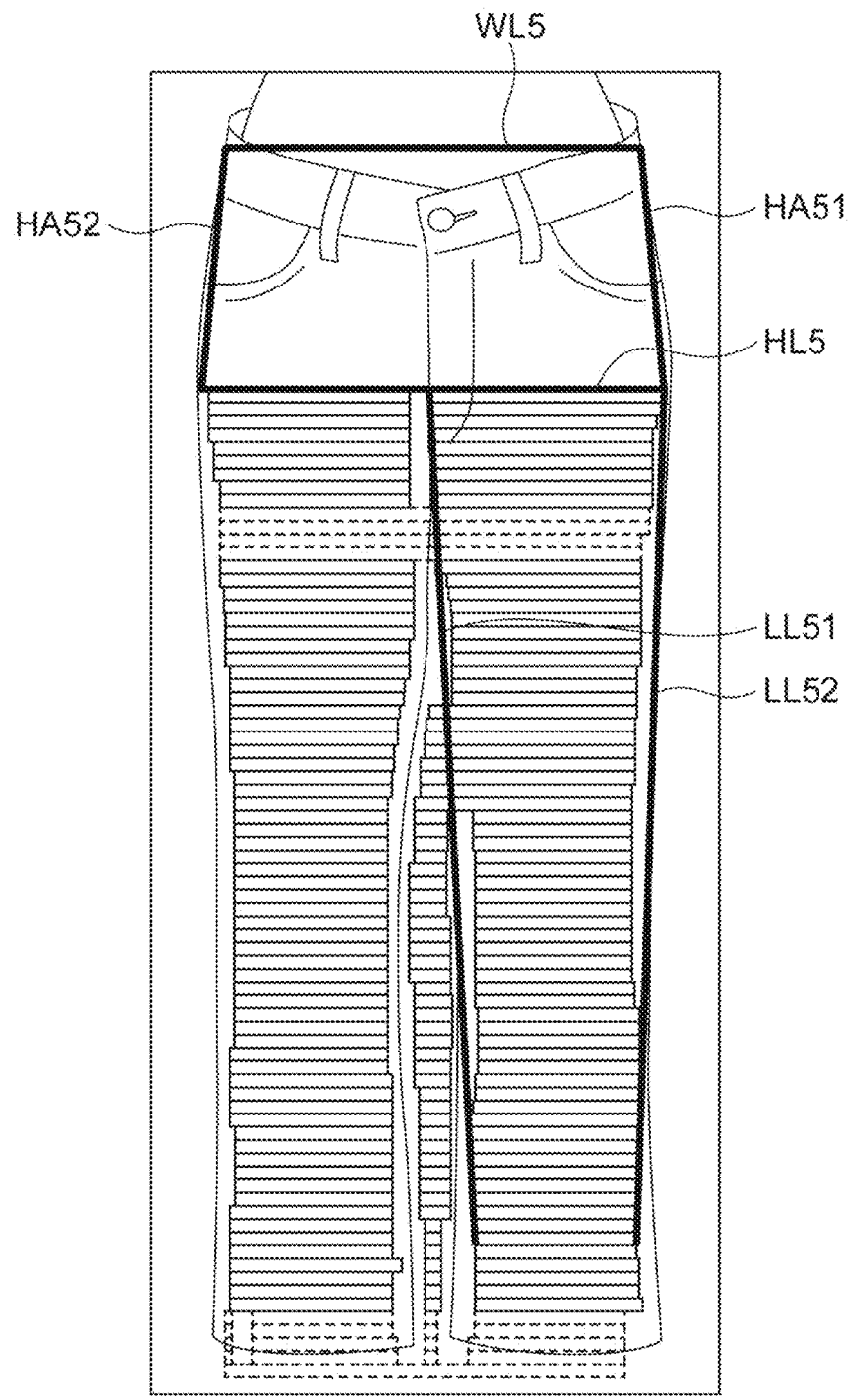
FIG. 16 is a view showing an example of specifying the shape of pants.

For example, when the target image shown in FIG. 16 is acquired, the specifying unit 17 determines in Step S21 that the leg line angle, which is the angle between the first leg line LL51 and the second leg line LL52, is not a specified value or more. Then, in Step S23, because the hip line angle, which is the angle between the left hip line HA51 and the right hip line HA52 obtained by connecting the left and right ends of the waist line WL5 and the left and right ends of the hip line HL5, respectively, is not a specified value or more, the specifying unit 17 determines that the shape of the pants shown in the target image of FIG. 16 is a straight type.

Note that, when the leg shape acquisition unit 14 acquires, as the leg shape information, a thigh width and a hem width, the specifying unit 17 determines in Step S21 whether a difference between the thigh width and the hem width is a specified value or more. When it is determined that a difference between the thigh width and the hem width is a specified value or more, the process proceeds to Step S22. On the other hand, when it is not determined that a difference between the thigh width and the hem width is a specified value or more, the process proceeds to Step S23. Although the specified value related to determining a difference between the thigh width and the hem width is set in advance, it may be variable according to the distance between the hip line related to specifying the thigh width and the lower end of the leg region related to specifying the hem width. Specifically, the specified value for determining a difference between the thigh width and the hem width may be set larger as the distance between the hip line and the lower end of the leg region increases.

When the leg shape acquisition unit 14 acquires, as the leg shape information, the thigh width and the hem width, the specifying unit 17 determines in Step S22 which of the thigh width and the hem width is larger. When it is determined that the thigh width is larger than the hem width, the specifying unit 17 determines that the shape of the pants shown in the target image is a skinny type. On the other hand, when it is determined that the hem width is larger than the thigh width, the specifying unit 17 determines that the shape of the pants shown in the target image is a wide type.

Referring back to FIG. 12, in Step S8, the output unit 18 outputs information about the shape of the pants specified in Step S7 (S8).

Figure 17:
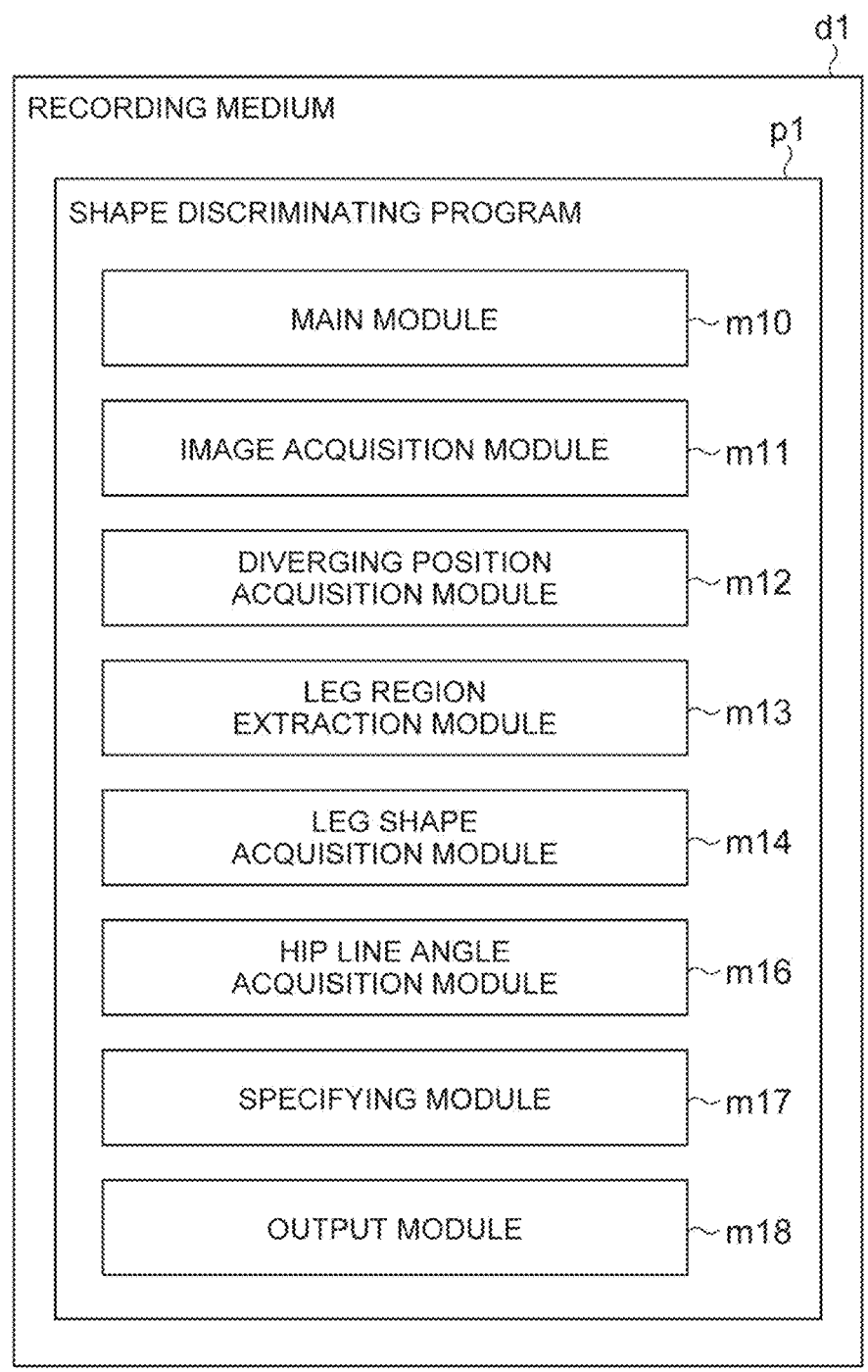
FIG. 17 is a view showing the configuration of a shape discriminating program.

A shape discriminating program that causes a computer to function as the shape discriminating device 1 is described hereinafter with reference to FIG. 17. A shape discriminating program p1 includes a main module m10, an image acquisition module m11, a diverging position acquisition module m12, a leg region extraction module m13, a leg shape acquisition module m14, a hip line angle acquisition module m16, a specifying module m17 and an output module m18.

The main module m10 is a part that exercises control over the shape discrimination processing. The functions implemented by executing the image acquisition module m11, the diverging position acquisition module m12, the leg region extraction module m13, the leg shape acquisition module m14, the hip line angle acquisition module m16, the specifying module m17 and the output module m18 are respectively equal to the functions of the image acquisition unit 11, the diverging position acquisition unit 12, the leg region extraction unit 13, the leg shape acquisition unit 14, the hip line angle acquisition unit 16, the specifying unit 17, and the output unit 18 in the shape discriminating device 1 shown in FIG. 1.

The shape discriminating program p1 is provided by a non-transitory storage medium d1 such as a magnetic disk, an optical disk or semiconductor memory, for example. Further, the shape discriminating program p1 may be provided as a computer data signal superimposed onto a carrier wave through a communication network.

In the shape discriminating device 1, the shape discriminating method and the shape discriminating program p1 according to the embodiment described above, leg shape information concerning variation in lateral width of a leg part of pants is acquired based on a diverging position, which is a position at which the pants diverge into two leg parts or a position that can be regarded as a position at which the pants diverge into two leg parts, and a leg region extracted from a target image in which the pants are shown. Because the shape of the pants is specified based on the leg shape information where the characteristics of the shape of the pants appear, it is possible to appropriately specify and discriminate the shape of the pants without comparison with a template.

An embodiment of the present invention is described in detail above. However, the present invention is not limited to the above-described embodiment. Various changes and modifications may be made to the present invention without departing from the scope of the invention.

REFERENCE SIGNS LIST

1 . . . shape discriminating device, 3 . . . image storage unit, 11 . . . image acquisition unit, 12 . . . diverging position acquisition unit, 13 . . . leg region extraction unit, 14 . . . leg shape acquisition unit, 14a . . . leg line generation unit, 14b . . . leg line angle acquisition unit, 16 . . . hip line angle acquisition unit, 17 . . . specifying unit, 18 . . . output unit, p1 . . . shape discriminating program, d1 . . . storage medium, m10 . . . main module, m11 . . . image acquisition module, m12 . . . diverging position acquisition module, m13 . . . leg region extraction module, m14 . . . leg shape acquisition module, m16 . . . hip line angle acquisition module, m17 . . . specifying module, m18 . . . output module

The invention claimed is:

1. A shape discriminating device comprising:
at least one memory configured to store computer program code;
at least one processor configured to access said memory and operate as instructed by said computer program code, said computer program code including:
image acquisition code configured to cause at least one of said at least one processor to acquire a target image being an image where pants are shown;
diverging position acquisition code configured to cause at least one of said at least one processor to acquire, as a diverging position, a position where the pants diverge into two leg parts or a position which can be regarded as a position where the pants diverge into two leg parts;

leg region extraction code configured to cause at least one of said at least one processor to extract a leg region from a region showing the pants in the target image;

leg shape acquisition code configured to cause at least one of said at least one processor to acquire leg shape information concerning variation in lateral width of a leg part of the pants based on the diverging position and the leg region;

specifying code configured to cause at least one of said at least one processor to specify a shape of the pants based on the leg shape information; and output code configured to cause at least one of said at least one processor to output information concerning the shape of the pants.

2. The shape discriminating device according to claim 1, wherein the leg shape acquisition code includes leg line generation code configured to cause at least one of said at least one processor to generate a first leg line and a second leg line, the first leg line connecting from a center of a hip line to an inner portion at a lower end of the leg region, the hip line being drawn through the diverging position to both lateral ends of the region showing the pants, and the second leg line connecting from an outer portion at the lower end of the leg region to one end of the hip line corresponding to the outer portion; and leg line angle acquisition code configured to cause at least one of said at least one processor to acquire a leg line angle being an angle between the first leg line and the second leg line, and specifying code also configured to cause at least one of said at least one processor to acquire the leg line angle as the leg shape information.

3. The shape discriminating device according to claim 2, wherein when the leg line angle is a specified value or more and a distance between upper ends of the first leg line and the second leg line is larger than a distance between lower ends of the first leg line and the second leg line, the specifying code causes at least one of said at least one processor to determine that the shape of the pants is a skinny type, and when the leg line angle is a specified value or more and a distance between upper ends of the first leg line and the second leg line is smaller than a distance between lower ends of the first leg line and the second leg line, the specifying code causes at least one of said at least one processor to determine that the shape of the pants is a wide type.

4. The shape discriminating device according to claim 2, further comprising:

hip line angle acquisition code configured to cause at least one of said at least one processor to specify a waist position of the pants based on the diverging position, and acquire a hip line angle being an angle between a left hip line and a right hip line obtained by connecting left and right ends of a waist line and left and right ends of the hip line, respectively, the waist line being drawn through the waist position to both lateral ends of the region showing the pants, and wherein the specifying code is configured to cause at least one of said at least one processor to specify means specifies the shape of the pants based on the hip line angle and the leg shape information.

5. The shape discriminating device according to claim 4, wherein when the leg line angle is less than a specified value and the hip line angle is a specified value or more, the specifying code causes at least one of said at least one processor to specify that the shape of the pants is a wide type, and when the leg line angle is less than a specified value and the hip line angle is less than a specified value, the specifying code causes at least one of said at least one processor to specify that the shape of the pants is a straight type.

6. The shape discriminating device according to claim 1, wherein the leg shape acquisition code is configured to cause at least one of said at least one processor to acquire a thigh width and a hem width, the thigh width being a length from a center to one end of a hip line drawn through the diverging position to both lateral ends of the region showing the pants, and the hem width being a width at a lower end of a region corresponding to one of two legs in the leg region, and the specifying code is configured to cause at least one of said at least one processor to acquire the thigh width and the hem width as the leg shape information.

7. The shape discriminating device according to claim 1, wherein the diverging position acquisition code is configured to cause at least one of said at least one processor to acquire, as the diverging position, a position where a lateral width is largest in a vertical direction of a contour of the pants when a waist and a hem of the pants are located at top and bottom, respectively.

8. The shape discriminating device according to claim 7, wherein the diverging position acquisition code is configured to cause at least one of said at least one processor to approximate each of contours on both lateral sides of the pants by a quadratic curve, and acquires, as the diverging position, a position where a distance between the both curves is largest in a vertical direction.

9. The shape discriminating device according to claim 8, wherein the diverging position acquisition code is configured to cause at least one of said at least one processor to calculate a plurality of quadratic curves based on arbitrary three points on a contour line representing a contour on both lateral sides of the pants, and uses a quadratic curve with a highest degree of consistency with the contour line, among the calculated plurality of quadratic curves, for acquiring the diverging position.

10. The shape discriminating device according to claim 1, wherein the leg region extraction code is configured to cause at least one of said at least one processor to extract, as the leg region, at least one region in a region showing the pants and separable into a left leg region and a right leg region respectively corresponding to a left leg and a right leg.

11. The shape discriminating device according to claim 10, wherein the leg region extraction code is configured to cause at least one of said at least one processor to extract, as the leg region, a region with a longest vertical length in the region showing the pants and separable into the left leg region and the right leg region.

12. The shape discriminating device according to claim 10, wherein
the leg region extraction code is configured to cause at least one of said at least one processor to extract, as the leg region, a region where a difference in width between the left leg region and the right leg region corresponding to each other at the same vertical height is a specified value or less in the region showing the pants and separable into the left leg region and the right leg region.

13. The shape discriminating device according to claim 12, wherein
the leg region extraction code is configured to cause at least one of said at least one processor to extract, as the leg region, a region with a larger width between the left leg region and the right leg region corresponding to each other at the same vertical height.

14. A shape discriminating method in a shape discriminating device, the method performed by at least one computer processor, comprising:
acquiring a target image being an image where pants are shown;
acquiring, as a diverging position, a position where the pants diverge into two leg parts or a position which can be regarded as a position where the pants diverge into two leg parts;
extracting a leg region from a region showing the pants in the target image;
acquiring leg shape information concerning variation in lateral width of a leg part of the pants based on the diverging position and the leg region;
specifying a shape of the pants based on the leg shape information; and
outputting information concerning the shape of the pants.

15. A non-transitory computer-readable recording medium storing a shape discriminating program causing a computer to:
acquire a target image being an image where pants are shown;
acquire, as a diverging position, a position where the pants diverge into two leg parts or a position which can be regarded as a position where the pants diverge into two leg parts;
extract a leg region from a region showing the pants in the target image;
acquire leg shape information concerning variation in lateral width of a leg part of the pants based on the diverging position and the leg region;
specify a shape of the pants based on the leg shape information; and
configured to output information concerning the shape of the pants.

* * * * *